Patented Jan. 23, 1940

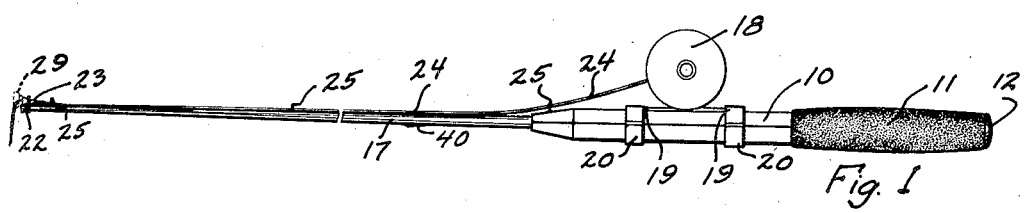

2,187,807

UNITED STATES PATENT OFFICE 2,187,807

FISHING ROD

Lawrence A. Muckey, Mapleton, Iowa

Application October 28, 1935, Serial No. 47,135
Renewed June 15, 1939

5 Claims. (Cl. 43—19)

My invention relates generally to a fishing rod which incorporates features for casting a line.

An object of my invention is to provide means for casting the line by merely pressing certain control means.

A further object of my invention is to provide means for efficiently casting the line to a maximum distance, at the same time utilizing the normal structure and form of a fishing rod.

A further object of my invention is to provide means for adjusting the range of the rod in casting.

A further object of my invention is to provide a rod with fool-proof characteristics so that the same will function properly under any conditions.

A further object of my invention is to provide the above mentioned objects in a simple, durable construction which can be manufactured at a very reasonable cost.

With these and other objects in view, my invention consists in the construction, arrangement, and combination of the various parts of my device, whereby the objects contemplated are attained, as hereinafter more fully set forth, pointed out in my claims, and illustrated in the accompanying drawing, in which:

Figure 1 is a side elevation of the rod,

Figure 2 is an enlarged detail view taken in section along the longitudinal axis of the rod, Figure 3 is a further sectional view showing the rod in the collapsed position, Figure 4 is an enlarged detail view of the button control, Figure 5 is a further detail view of the same, Figure 6 is a front view of the rod, and Figure 7 is an enlarged detail of the weighted hook casting weight.

I have used the character 10 to designate generally the handle of the fishing rod. This handle is made hexagonal shaped about its periphery for reasons to be explained and slipped over the end of the handle is the hand grip 11 which is made of cork or other suitable material. The handle 10 is hollow and includes the plug 12 screwed into the end thereof.

Inside of the hollow member 10 is placed the strong compression spring 13 against which is seated the hexagonal member 14. The forward end of the handle 10 includes the tapered portion 15 which receives the tapered faces 16 which are integral continuations of the member 14.

Extending from the tapered faces 16 is the rod 17 which follows the construction similar to that used in casting rods and the like.

The reel 18 is suitably secured at 19 in the usual manner, to the handle 10 by means of the pieces 20.

The hexagonal form of the handle is continued rearwardly until the rear end of the rod or, if desired, to any point such as indicated by the character 21.

Attached to the end of the rod 17 is the loop member 22 which receives the approximately conical member 23 which is a weight made of a heavy material such as lead.

The line 24 passing from the reel passes through suitable loops 25 on the rod in the usual manner and this line is tied to one end of the member 23 at 26. Attached to the other end of the member 23 at 27 is the line 28 which is attached to the hook or fly.

The weight 23 is made in various sizes, a larger size being shown by the dotted line 29 in Figure 1. The reason for this will be explained later.

The hexagonal member 14 includes the recess 30 at the bottom of which is placed the spring 31. Against the spring 31 is placed the pin 32 which includes the rounded upper surface 33.

The handle 10 includes the circular opening 34 which is somewhat larger in diameter than the pin 32.

Attached to the handle 10 is the keeper plate 35 which includes the opening 36. Received within the opening 36 is the restricted portion 37 of the button 38 which includes the peened over end 39 which is slidably engaged within the opening 34. The length of the portion 37 is restricted so that the portion 39 will be practically flush or slightly above the inside surface of the hollow hexagonal handle when the rod is sprung outwardly. (See Figure 5.)

The operation of the rod will now be explained:

The principal objective contemplated in my invention is that of causing the line to be cast from the end of the fishing rod without the necessity of throwing the pole in an arc, or by simply holding the rod forward in the hand and releasing a suitable controlled means.

To set the rod the handle is held in one hand and an upper portion of the rod such as at the further handle 40 is grasped in the other hand and the rod is forced inwardly with respect to the hollow handle. As soon as the pin 32 passes adjacent the opening 34 it will spring outwardly and in returning will be held therein, the spring 13 being retained under powerful compression.

In casting, the grip 11 is held in the hand and is pointed in the desired direction. The thumb or any finger of the hand then presses the button 38 downwardly within the cavity 41 in the cork handle. As soon as the portion 39 is practically flush with the inside periphery of the hollow member 10 the pin 32 will also be forced downwardly correspondingly and aided by the curvature 33 and especially the compression force in the spring 13, the member 14 will fly outwardly carrying the rod 17 with it. At the same time the weight 23 is carried outwardly under great momentum unreeling the line from the reel and as soon as the tapered portions 15 and 16 engage the rod itself will cease its outward motion but the great momentum and inertia imparted to the weight 23 will cause it to carry the line out to a considerable distance.

Since the weight 23 is made in various sizes these sizes can be used in the same loop or varied sized loops so that greater distances can be cast if desired.

The hexagonal form of the slidably engaged members is important since it acts as a guide to the pin 32 and also prevents any attendant twisting of the rod.

In case it is desired to dispense with the spring features and use the rod for still fishing or other purposes the socket 41a is supplied at the end thereof which is adapted to receive the extension member 42 which will lengthen the rod correspondingly for the aforesaid purpose.

The rod in this form is simple and presents a form and structure very similar to that of ordinary casting rods, and yet accomplishes the result of casting automatically without an attendant or unnecessary multiplying of parts.

It will now be seen that I have provided a fishing rod which includes means for automatically casting the line and formed with extremely efficient and simple means for releasing the pressure built up within the rod handle.

It will also be seen that I have provided such a fishing rod which will allow adjustment of the range of the rod.

It will also be seen that I have provided a rod having simple and fool-proof characteristics, which is of simple and durable construction, and which can be manufactured at a very reasonable cost.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. A fishing rod comprising a hollow handle, a spring within the handle, a line-bearing rod including an enlarged portion received within the handle and adapted to compress the spring, said enlarged portion including a pin adapted to be spring-urged against the inside of the hollow handle, and means for retaining the pin to cause retention of the spring under pressure, said retaining means including a button, and an opening in the handle to receive the button, said opening and button being of greater diameter than said pin, said button adapted to release the pin from retention within the opening when the button is forced downwardly.

2. A fishing rod comprising a hollow handle, a spring within the handle, a line-bearing rod including an enlarged portion received within the handle and adapted to compress the spring, said enlarged portion including a pin adapted to be spring-urged against the inside of the hollow handle, and means for retaining the pin to cause retention of the spring under pressure said retaining means including a button, and an opening in the handle to receive the button, said opening and button being of greater diameter than said pin, said button being adapted to release the pin from retention within the opening when the button is forced downwardly, the lower end of said button including a flanged portion adapted to lie approximately flush with the inside surface of the handle, to cause release of the said rod.

3. A fishing rod comprising a hollow handle, a spring within the handle, a line-bearing rod including an enlarged portion received within the handle and adapted to compress the spring, said enlarged portion including a pin adapted to be spring-urged against the inside of the hollow handle, and means for retaining the pin to cause retention of the spring under pressure, said retaining means including a button, and an opening in the handle to receive the button, said opening and button being of greater diameter than said pin, said button being adapted to release the pin from retention within the opening when the button is forced downwardly, said enlarged portion being polygonal shaped, and said hollow handle being polygonal shaped and corresponding therewith to cause guiding of the pin and to prevent twisting of the rod.

4. A fishing rod comprising a hollow handle, a spring within the handle, a line-bearing rod including an enlarged portion received within the handle and adapted to compress the spring, said enlarged portion including a pin adapted to be spring-urged against the inside of the hollow handle, and means for retaining the pin to cause retention of the spring under pressure, said retaining means including a button, and an opening in the handle to receive the button, said opening and button being of greater diameter than said pin, said button adapted to release the pin from retention within the opening when the button is forced downwardly, said enlarged portion being polygonal shaped, and said hollow handle being polygonal shaped and corresponding therewith to cause guiding of the pin and to prevent twisting of the rod, said rod including a female socket end, and an end section for engaging the socket end to cause lengthening of the fishing rod for auxiliary purposes.

5. A fishing device comprising a hollow handle, a reel attached to the handle, a rod adapted to be compressed against pressure within the handle, said handle having an opening, a spring-urged pin within the rod adapted to co-act with the opening, means for releasing the pin including a button slidably engaged with the handle, a line on said reel adapted to pass along the rod, an end loop attached to the rod, and a substantially conical weight attached to the line and received within the loop.

LAWRENCE A. MUCKEY.